UNITED STATES PATENT OFFICE 2,132,560

AZO DYESTUFFS AND PROCESS OF MAKING THE SAME

Friedrich Felix and Jakob Scheidegger, Basel, Switzerland, assignors to the firm of Society of Chemical Industry in Basle, Basel, Switzerland No Drawing. Application September 11, 1935, Serial No. 40,191. In Switzerland September 28, 1934

9 Claims. (Cl. 260—200)

This invention relates to the manufacture of azo-dyestuffs by coupling a diazo-compound of an aromatic base of the formula

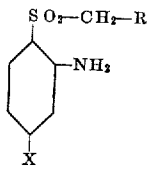

wherein R is a hydrogen atom or an alkyl or aryl radical, and X is a hydrogen or a halogen atom, with a component which contains as the group directing the coupling a substituted or non-substituted amino-group. Such components have in great number been disclosed in application Serial No. 12,299 of March 21, 1935.

Suitable bases for producing the diazo-compounds are:—1-aminobenzene-2-methylsulfone, further such aminosulfones as contain in the alkyl-group united with the sulfone-group several carbon atoms, for example 1-aminobenzene-2-ethylsulfone, 1-aminobenzene-2-propylsulfone and 1-aminobenzene-2-butylsulfone; further aminosulfones in which the sulfone-group contains an aralkyl-radical, for instance 1-aminobenzene-2-benzylsulfone or 1-aminobenzene-2-chlorobenzylsulfone, further products such as 1-amino-5-chlorobenzene-2-methylsulfone, 1-amino-5-bromobenzene-2-methylsulfone, 1-amino-5-chlorobenzene-2-ethylsulfone, and the like.

According to the selection of the diazo-compound and the coupling component the dyestuff obtained is suitable for dyeing animal fibers or has a good affinity for esters and ethers of cellulose, for instance acetate artificial silk. If the dyestuff produced has at any position in the molecule a sulfonic acid group it may be used with advantage for dyeing animal fibers or for printing acetate artificial silk, while dyestuffs sparingly soluble in water, for instance those free from sulfonic acid groups, are particularly suitable for dyeing acetate artificial silk. Among the coupling components suitable for making wool-dyestuffs there may be named, quite generally, amino- or hydroxy-compounds capable of being coupled and belonging to the benzene and naphthalene series, for instance α- or β-naphthylamine and their sulfonic acids, or β-naphthylamine alkylated at the nitrogen, for instance ethyl-β-naphthylamine and its sulfonic acids; also aminohydroxynaphthalenes, for instance 1,5-aminohydroxynaphthalene and its sulfonic acids; particularly also 2,8-aminohydroxynaphthalene and 2,8-aminohydroxynaphthalene-6-sulfonic acid and their N-alkylated and arylated derivatives, such as 2-phenylamino-8-hydroxynaphthalene-6-sulfonic acid. Bases of the aromatic series, for instance diphenylamine and its sulfonic acids, alkyl-anilines, such as ethyl-benzylaniline and ethyl-benzylaniline-sulfonic acid, may also be used. For dyeing acetate artificial silk suitable dyestuffs may be made by using diazo-components of the aforesaid kind which are free from sulfonic acid groups and as coupling components simple aromatic bases, such as aniline and its homologues and analogues. Other bases are aniline, ortho- and meta-toluidine, para-xylidine, para-cresidine, 2,5-dihydroxyalkylaminobenzene, naphthylamines, amines which are alkylated or hydroxyalkylated in the amino-group and also hydroxyalkylated amines in which the hydroxy-group is capable of being etherified or esterified. All these coupling components are characterized by reacting with diazo components in such a manner that the —N=N—group of the diazo radical enters in 2- or 4-position to the NH₂ or substituted NH₂-group which causes coupling. The new dyestuffs correspond therefore to the general formula

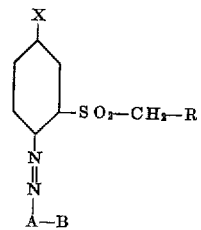

in which X stands for a hydrogen or a halogen atom, R stands for hydrogen, alkyl or aryl, A stands for an aromatic nucleus of the benzene or naphthalene series, and B stands for a substituted or non-substituted amino group standing in the 2- or 4-position to the —N=N—group, which products are dark powders, soluble in pyridine to yellow, orange, red and violet solutions, and dyeing lacquers and the fiber similar tints. The properties of fastness and the tints produced with these dyestuffs differ greatly when the substituents are varied.

While the dyestuffs containing sulfonic acid groups dye wool in acid baths, the insoluble dyestuffs, which are suitable for dyeing acetate artificial silk, are advantageously first brought into a finely dispersed condition. Thus they may be ground in the usual dispersing agents, for example sulfite cellulose lye or the sulfonated residue of the benzaldehyde manufacture. By cautiously drying pastes made in this manner especially good dyeing properties are produced.

The aforesaid materials are dyed yellow to red and blue-red and violet tints according to the choice of the components of the dyestuff. These dyestuffs are particularly useful when it is required to provide wool with a dyeing which has an excellent fastness to light and fastness to washing. They are suitable in quite outstanding degree for the production of combination dyeings, because they have a particularly good levelling capacity which considerably exceeds that of the known comparable products.

The new dyestuffs may also be used for dyeing lacquers, varnishes and artificial masses, such as nitrocellulose lacquers, acetyl cellulose lacquers, formaldehyde-urea resins and formaldehyde-phenol resins, respectively, there being obtained similar tints as on the fiber.

The following examples illustrate the invention, the parts being by weight:—

*Example 1*

171 parts of 1-aminobenzene-2-methylsulfone are converted into the diazo-compound in hydrochloric acid solution by means of 69 parts of sodium nitrite. Into the diazo-solution there is dropped gradually a neutral solution of 313 parts of the sodium salt of N-ethyl, N-p-sulfobenzyl aniline. Coupling is completed by addition of sodium-carbonate or -acetate, and the dyestuff is salted out. After filtration and drying there is obtained a red powder which dissolves in water to an orange solution and dyes wool in an acid solution level orange tints. The dyestuff of the formula

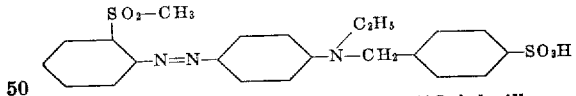

is suitable for printing acetate artificial silk and gives deep yellow-orange prints which are of good fastness to light and do not sublime.

*Example 2*

171 parts of 1-aminobenzene-2-methylsulfone are diazotized in the usual manner in hydrochloric acid solution by addition of 69 parts of sodium nitrite. To this diazo-solution there is added, by drops, a neutral solution of 239 parts of 2 - amino - 8 - hydroxynaphthalene-6-sulfonic acid. The whole is stirred until the coupling, which may be accelerated, if desired, by careful addition of a body binding acid or having a buffer effect, is complete. The solution is then made neutral and the dyestuff of the formula

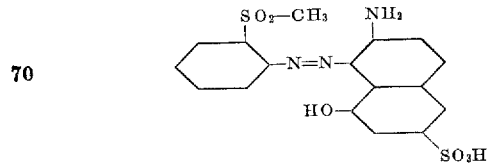

is salted out, filtered and dried. It has a remarkable levelling capacity and dyes wool red tints of a high degree of fastness to light. If, for the 1-aminobenzene-2-methylsulfone there is used 1-amino-5-chlorobenzene-2-methylsulfone or 1-aminobenzene-2-ethylsulfone, there is obtained a somewhat bluer-red of equal fastness.

*Example 3*

247.2 parts of 1-aminobenzene-2-benzylsulfone are diazotized in the usual manner by means of 69 parts of sodium nitrite and hydrochloric acid. Into the diazo-solution there is run a neutral solution of 239 parts of 2-amino-8-hydroxynaphthalene-6-sulfonic acid. The suspension is neutralized with sodium carbonate and the precipitated dyestuff of the formula

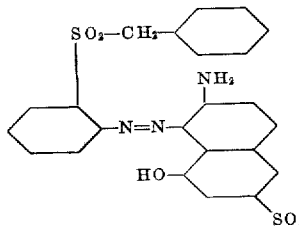

is filtered and dried. It dyes wool in an acid bath fast blue-red tints.

*Example 4*

171 parts of 1-aminobenzene-2-methylsulfone are converted in hydrochloric acid solution into the diazo-compound by means of 69 parts of sodium nitrite. Into the diazo-solution there is run an aqueous solution of 137 parts of paracresidine and the necessary quantity of hydrochloric acid. Coupling may be accelerated by the addition of sodium acetate or another substance of like action, and the precipitated dyestuff of the formula

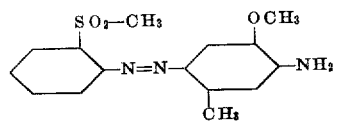

is filtered and washed neutral. It is an orange powder, soluble in organic solvents to a red-yellow solution and dyeing acetate silk fast golden-yellow tints. The dyestuff from β-naphthylamine dyes cellulose acetate orange tints, and the dyestuff from ethyl-β-naphthylamine dyes the same red tints.

The corresponding dyestuff from 1-aminobenzene-2-ethylsulfone and cresidine dyes somewhat redder tints while the dyestuff obtainable from 1-aminobenzene-2-methylsulfone or 1-aminobenzene-2-ethylsulfone by diazotization and coupling with dimethyl-aniline dyes acetate silk fast orange tints.

The dyeings obtainable with diazotizable dyestuffs containing amino-groups may be diazotized on the fiber and developed with coupling components, such as 1-phenyl-3-methyl-5-pyrazolone, resorcinol, paracresotinic acid, β-naphthol, 2,3-hydroxynaphthoic acid, ethyl-α or β-naphthylamine.

*Example 5*

2.5 parts of the dyestuff obtained as described in Example 2 are dissolved in 1000 parts of boiling water. The dye-bath is made up with 2500 parts of water, at 50–60° C., whereupon the dissolved dyestuff is added and is followed by 500 parts of water rinsings. The 4000 parts of liquor constituting the dye-bath now receives 10 parts of crystallized sodium sulfate. 100 parts of wool are then entered at 50–60° C., and 40 parts of sulfuric acid of 10 per cent. strength are added. The bath is heated gradually to 85–90° C. and dyeing is continued for 1 hour at this temperature. The goods are finished as usual and there is produced a very pure red dyeing of excellent properties of fastness.

*Example 6*

10 parts of the dyestuff of Example 4 are stirred with a suitable dispersing agent such as Turkey red oil, sulfite cellulose solution or the sulfonation product of the residue of the benzaldehyde manufacture to form a uniform paste containing 20 per cent. of dyestuff. 1 part of this paste is very intimately mixed with 10 parts of water at 50° C. and so much concentrated soap solution as will make the dye-bath a soap solution of 2 per cent. strength. This mixture is diluted with cold water to about 300 parts. Into the emulsion thus made there are entered 10 parts of acetate artificial silk yarn which is handled while the bath is heated within ¾ hour to 75° C.; dyeing is continued for ¼ hour at this temperature. The goods are then rinsed and brightened as usual. There is obtained a vivid golden yellow dyeing.

What we claim is:—

1. The azo-dyestuffs of the general formula

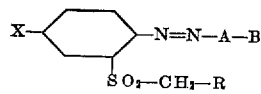

in which X stands for a member of the group consisting of hydrogen and halogen, R stands for a member of the group consisting of hydrogen, alkyl and aryl, A stands for an aromatic nucleus of the benzene or naphthalene series, and B stands for an amino-group standing in the 2- or 4-position to the —N=N-group, which products are dark powders, soluble in pyridine to yellow, orange, red and violet solutions, and dyeing lacquers and the fiber similar tints.

2. The azo-dyestuffs of the general formula

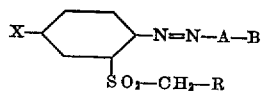

in which X stands for a member of the group consisting of hydrogen and halogen, R stands for a member of the group consisting of hydrogen, alkyl and aryl, A stands for an aromatic nucleus of the naphthalene series, and B stands for an amino-group standing in the 2- or 4-position to the —N=N-group, which products are dark powders, soluble in pyridine to orange, red and violet solutions, and dyeing lacquers and the fiber similar tints.

3. The azo-dyestuffs of the general formula

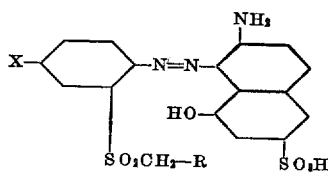

in which X stands for a member of the group consisting of hydrogen and halogen, and R stands for a member of the group consisting of hydrogen, alkyl and aryl, which products are dark powders soluble in water to red solutions and dyeing wool in an acid bath red tints which are very level and fast to light.

4. The azo-dyestuffs of the general formula

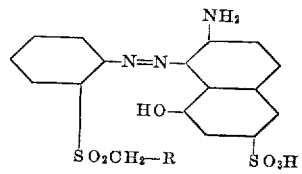

in which R stands for a member of the group consisting of hydrogen, alkyl and aryl, which products are dark powders soluble in water to red solutions, and dyeing wool in an acid bath red tints which are very level and fast to light.

5. The azo-dyestuff of the formula

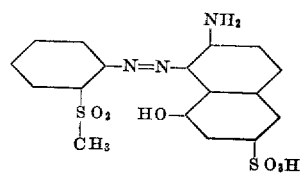

which product is a dark powder soluble in water to red solutions, and dyeing wool in an acid bath red tints which are very level and fast to light.

6. The azo-dyestuff of the formula

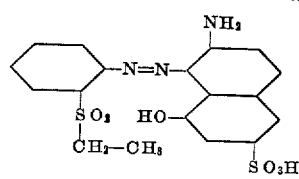

which product is a dark powder soluble in water to red solutions, and dyeing wool in an acid bath red tints which are very level and fast to light.

7. The azo-dyestuff of the formula

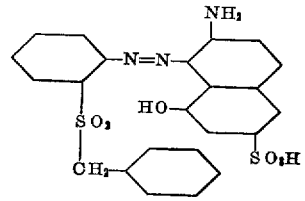

which product is a dark powder soluble in water to red solutions, and dyeing wool in an acid bath red tints which are very level and fast to light.

8. Water-insoluble azo dyestuffs having the general formula

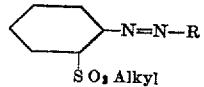

wherein R represents the radical of an aromatic amine coupling component selected from the group consisting of aminobenzenes and aminonaphthalenes, which has been coupled in para position to the amino group.

9. Water-insoluble azo dyestuffs having the general formula

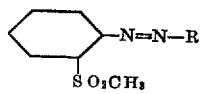

wherein R represents the radical of an aromatic amine coupling component selected from the group consisting of aminobenzenes and aminonaphthalenes, which has been coupled in para position to the amino group.

FRIEDRICH FELIX.
JAKOB SCHEIDEGGER.